J. FRITSCH.
FLY TRAP.
APPLICATION FILED FEB. 2, 1911.
1,005,530.
Patented Oct. 10, 1911.
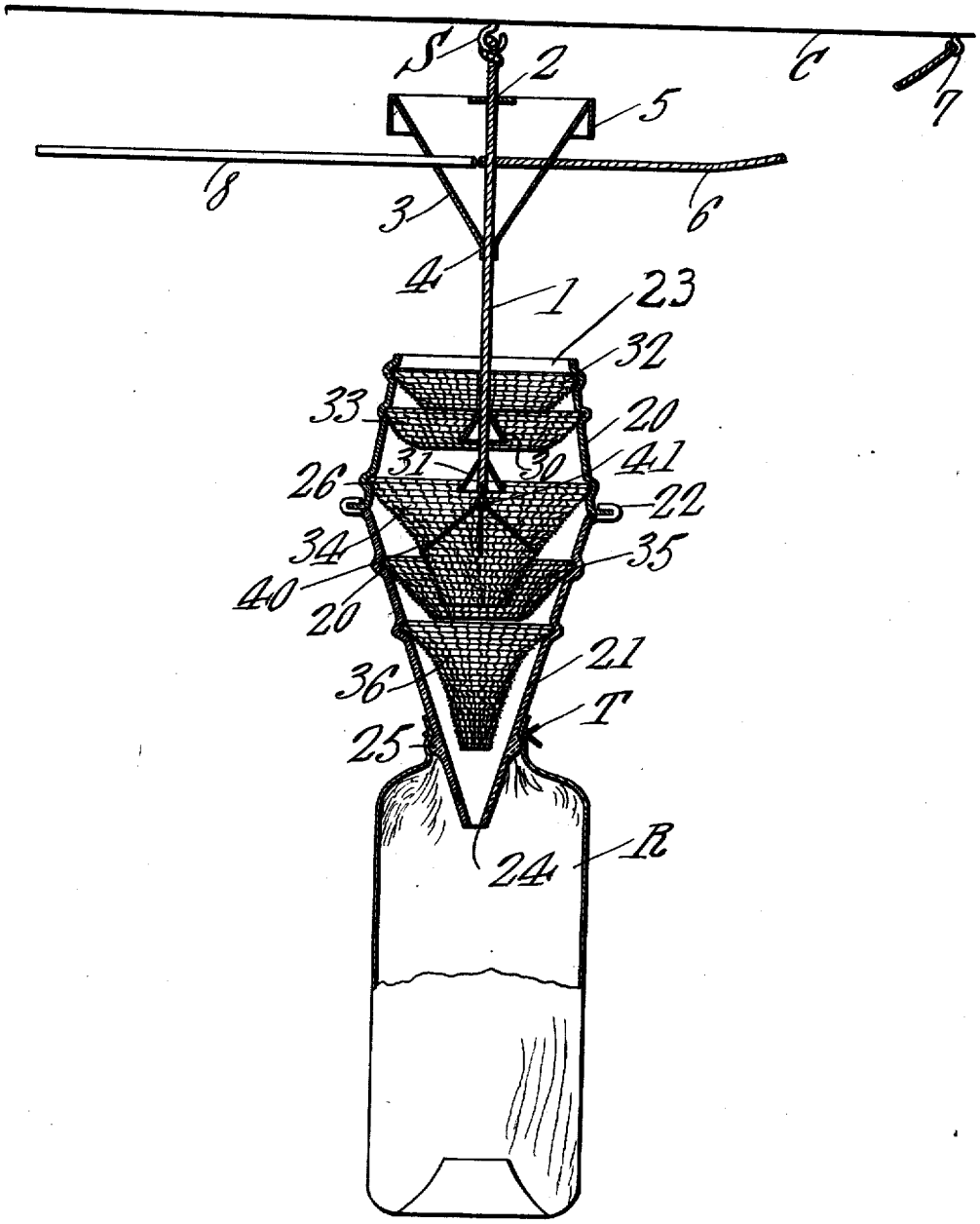
Witnesses
Joseph Fritsch, Inventor
by C. A. Snow & Co.
Attorneys

UNITED STATES PATENT OFFICE.

JOSEPH FRITSCH, OF SEDRO WOOLLEY, WASHINGTON.

FLY-TRAP.

1,005,530.  Specification of Letters Patent.  Patented Oct. 10, 1911.

Application filed February 2, 1911. Serial No. 606,254.

*To all whom it may concern:*

Be it known that I, JOSEPH FRITSCH, a citizen of the United States, residing at Sedro Woolley, in the county of Skagit and State of Washington, have invented a new and useful Fly-Trap, of which the following is a specification.

This invention relates to traps, and more especially to those adapted for catching insects; and the object of the same is to produce an improved fly trap which will mechanically catch flies or other insects that naturally accumulate at and near the top of an apartment.

To this end the invention consists in the details of construction hereinafter more fully described and claimed, and as shown in the drawing which illustrates my invention in a vertical sectional view.

In this drawing the letter C designates the ceiling or some overhead device, and S is a support therein such as a screw eye or hook; and the letter R designates a receptacle, in the present instance a paper bag tied around the lower end of my improved trap by a piece of string or twine T so that at times it may be removed and the trapped insects carried to some remote point and destroyed. It is the bane of the householder's life that flies and other insects will collect near the upper part of an apartment, well known to be the warm part, especially at night, and will crawl upon and disfigure the ceiling; and my invention is a trap of that type which is adapted to be supported by and to hang closely beneath the ceiling so that these pests will be collected within it, rather than of that type wherein the flies are attracted by a bait contained within the trap or are attracted to the trap by the food upon the table or stove. An overhead trap also possesses the advantage that it is not so unsightly, not likely to be knocked over, and occupies no space upon the table or support which carries it. It may even be made ornamental to an extent without departing from the spirit of my invention. One important feature of my device, however, consists in the provision of feeders which not only direct the insects to the trap but also keep them off the ceiling. Considerable latitude must be allowed the manufacturer in the shape and ornamentation of the trap itself and its feeders.

Coming now more particularly to a description of my invention, the numeral 1 designates a supporting cord, wire, or rod which is hung into the support S and depends therefrom, passing first through a cross bar 2 at the upper end of an inverted cone 3 whose apex 4 closely surrounds the cord 1 at a lower point and whose larger end has a depending flange 5 which is truly cylindrical or might flare a little and in either event is spaced from the exterior of the cone. Horizontally through the latter extend the feeders, herein shown as passing in one direction, although they could extend crosswise at right angles to each other so that there would be four arms, or in fact there might be more. At the right of the drawing the feeder is shown as consisting of a cord or flexible rod 6 led upward to a screw eye 7 within the ceiling or other support, but at the left of the drawing the feeder is shown as a stiff wire or rod which of course needs no support at its outer end. I have found by experiment that flies and other insects seeking the top of the apartment will light upon these feeder rods and crawl along them toward the cone, whereby they are prevented from lighting upon the ceiling. Reaching the cone, they crawl upward, but progress is checked by the flange 5 and diverted, and hence they crawl downward, past the apex 4, and farther downward along the cord 1.

The body of my fly trap comprises two members 20 and 21, connected at their meeting ends by a bayonet joint 22 (not necessary to illustrate in detail) or any other type of connection which renders them removable whereby they can be cleaned. Both members are tubular, the uppermost preferably tapering upward and open wide at its upper end 23, and the lowermost 21 tapering downward and preferably somewhat longer and open at its lower end 24 which constitutes the exit into the receptacle R. I might here say that this lower member is provided with an exterior rib 25 near its lower end 24, around and above which rib the twine T is tied so as to receive the receptacle R thereon. This twine of course could be a rubber or other fastening device without departing from the spirit of my invention. Both members are provided with internal annular grooves 26 for the truncated cones next to be described, and the grooves may be formed in a suitable way. If the members are of glass, the grooves will be molded therein; but if they are of metal the grooves may be spun or otherwise formed therein, in which case they will show on the outside in the shape of ribs that are ornamental rather than otherwise.

All cones in this invention are inverted cones, so that their larger ends are uppermost, but as the course of travel and the apexes are downward, the shape of the cones will be described with reference to the direction of travel. That is to say, the upper cone 3 hereinbefore described may be called the "accumulator cone" because it accumulates the flies crawling inward along the feeders 6 or 8 and directs them onto the supporting cord 1. The conical or partly conical shape of the body members is merely a matter of design.

Upon the support 1 near its lower end and within the upper member 20 are mounted what might be called "deflector cones" because they deflect the flies or other insects outward within this member 20, and these cones are of solid material such as metal and are comparatively small as shown. I have numbered them 30 and 31 respectively and shown but two. Supported within this upper member 20 is a series of what might be called "trapping cones" because they trap the flies or other insects, and these are truncated or open at their lower ends while their larger upper ends are seated within the grooves 26 which the ribs form in the wall of this member. They are to an extent nested, so that the open smaller end of one directs the insects into the open upper end of the one next below. They are relatively considerably larger than the deflector cones 30 and 31, which latter of course serve to deflect the flies away from the support 1 when they fly off the lower edge of the deflector cones, and hence they will be trapped under the lower edges of the trapping cones between their walls and the walls of the member 20. These trapping cones are of reticulated fabric such as fine wire mesh so as to admit light from above, and if the member itself be of glass of course there is light admitted from all sides thereof and the tendency of the insects when they pass off the lower edges of the deflector cones is to fly radially outward and upward a little, their outward progress being checked by the walls of the member and their upward progress being checked by the trapping cones. The latter are shown as three in number within the uppermost member, and I have designated them as 32, 33 and 34. In like manner the lowermost member 21 contains in the present instance two additional trapping cones 35 and 36, also of reticulated fabric; and the lowermost trapping cone 34 in the upper member and lowermost trapping cone 36 in the lower member are by preference rather long, so that the former will hang within the uppermost trapping cone 35 in the lower member and the latter (36) will depend to or almost to the exit opening 24 at the lower extremity of the lowermost member 21. The entire body of the trap is supported from the cord or stem 1 by means of diverging wires or cords 40 whose inner ends are attached to a hook or eye 41 at the lower end of the cord 1, and whose outer ends are herein shown as attached to one of the trapping cones as 34, although they might be attached to some other part of the body. My purpose is simply to support the body of the trap in such manner that it can be unhooked from the cord 1, and if it is constructed as shown in the drawing, the lower member 21 can be detached from the upper member 20 by turning one member upon the other and disconnecting the bayonet joint 22, thereby leaving the upper member hung from the support 1 although this is a matter of detail.

The action of my improved trap will now be understood. Flies collecting on the feeders travel toward the accumulating cone 3, and crawl down its body past its apex 4 on to the cord or support 1; thence down the latter to the deflecting cone 30 which directs them outward within the upper member 20 of the body. If they pass this cone they are deflected outward at 31 with the same result. In either case they fly outward and are trapped under some one of the trapping cones of which five are shown in the present instance, and in their fruitless efforts to escape they settle lower and lower and pass downward step by step until finally they pass out the exit 24 and collect within the receptacle R. The latter as above stated may be a paper bag removably connected as at T, and of course the size, proportion, and materials of the trap itself are unimportant.

What is claimed as new is:—

1. In an overhead fly trap, the combination with the trap body, and a receptacle to which it delivers; of a supporting cord connecting the body with an overhead point, and horizontally disposed feeders consisting of rods spaced beneath the overhead support and sustained by said cord.

2. In an overhead fly trap, the combination with the trap body, and a receptacle to which it delivers; of a supporting cord connecting the body with an overhead point, an inverted cone mounted on said cord and having a flange at its larger upper end diverging from its wall, and horizontally disposed feeders spaced beneath the overhead support and passing through said cone and sustained by said cord.

3. In an overhead fly trap, the combination with the trap body; of a support connecting the body with an overhead point, an inverted cone surrounding the support and having a flange at its larger upper end diverging from its wall, and feeders consisting of rods passing through said cone beneath its flange.

4. In a fly trap, the combination with a supporting cord sustained by a point overhead, a collecting cone surrounding the cord and having its apex directed downward, and horizontally disposed feeders carried thereby; of the trap body made in two members detachably connected and each having a series of internal surrounding grooves, a series of trapping cones of reticulated fabric having their larger upper ends seated in said grooves and their bodies truncated and open at their smaller lower ends, deflecting cones mounted on said cord within said trapping cones and relatively smaller than the latter, means for supporting the trap body from said cord, and a receptacle detachably connected to the lower end of the body.

In testimony that I claim the foregoing as my own, I have hereto affixed my signature in the presence of two witnesses.

JOSEPH FRITSCH.

Witnesses:
FRED. C. SCHOCH,
R. H. RAMSAY.

---

Copies of this patent may be obtained for five cents each, by addressing the "Commissioner of Patents, Washington, D. C."